March 3, 1942.  E. WILDHABER  2,274,761
GEAR CUTTER AND METHOD OF CUTTING GEARS
Filed April 17, 1937   7 Sheets-Sheet 1

Ernest Wildhaber Inventor

By
Attorney

March 3, 1942.  E. WILDHABER  2,274,761
GEAR CUTTER AND METHOD OF CUTTING GEARS
Filed April 17, 1937  7 Sheets-Sheet 2

Inventor
Ernest Wildhaber
By Schlesinger
Attorney

March 3, 1942.  E. WILDHABER  2,274,761
GEAR CUTTER AND METHOD OF CUTTING GEARS
Filed April 17, 1937  7 Sheets-Sheet 3

Ernest Wildhaber Inventor

By
*B. F. Schlesinger*
Attorney

Inventor
Ernest Wildhaber

March 3, 1942.  E. WILDHABER  2,274,761
GEAR CUTTER AND METHOD OF CUTTING GEARS
Filed April 17, 1937  7 Sheets-Sheet 5

Inventor
Ernest Wildhaber
By
B. E. Schlesinger
Attorney

March 3, 1942.  E. WILDHABER  2,274,761
GEAR CUTTER AND METHOD OF CUTTING GEARS
Filed April 17, 1937  7 Sheets-Sheet 6

Inventor
Ernest Wildhaber
By
Attorney

March 3, 1942. E. WILDHABER 2,274,761
GEAR CUTTER AND METHOD OF CUTTING GEARS
Filed April 17, 1937 7 Sheets-Sheet 7

Ernest Wildhaber Inventor
By B.E.Schlesinger
Attorney

Patented Mar. 3, 1942

2,274,761

UNITED STATES PATENT OFFICE 2,274,761

GEAR CUTTER AND METHOD OF CUTTING GEARS

Ernest Wildhaber, Irondequoit, N. Y., assignor to Gleason Works, Rochester, N. Y., a corporation of New York Application April 17, 1937, Serial No. 137,532

35 Claims. (Cl. 90—5)

The present invention relates to gears and their manufacture and particularly to bevel gears and to tools for and methods of manufacturing such gears. The invention comprises a new and improved form of bevel gearing, a novel method for manufacture of such gears, new and improved forms of cutters for carrying out this method and a new and improved method of relieving gear cutters and particularly gear cutters such as may be employed in the manufacture of the new gearing. The present application is confined to the new method and the new cutters.

One object of the invention is to provide a simple method for cutting bevel gears and particularly longitudinally curved tooth bevel gears so that the two members of a pair of such gears will mesh with less than full profile bearing.

Still another object of the invention is to provide an improved method for cutting longitudinally curved tooth gears so that the mating tooth surfaces of the two members of the pair may mesh with less than full length tooth contact.

Another object of the invention is to provide an improved form of face-mill gear cutter capable of successively rough and finish-cutting a tooth slot of a spiral bevel gear in a generating operation and in a single revolution of the cutter.

Another object of the invention is to provide a method of cutting longitudinally curved toothed gears in which one member of the pair may be form-cut and the other member of the pair generated and both members of the pair may be cut "spread-blade," that is, two tooth sides simultaneously.

A further object of the invention is to provide a cutter for cutting gears from the solid in a generating operation in which the blades or teeth of the cutter are so shaped as to do approximately equal amounts of work during cutting.

Still another object of the invention is to provide a gear cutter in which the blades or teeth will have portions of their cutting edges for cutting the finished tooth surfaces of the gear and other portions for roughing out the tooth spaces so arranged that the roughing portions will remove stock from the tooth spaces without interference with the operation of the finish-cutting portions.

Another object of the invention is to provide a cutter for finish-cutting gears directly from the solid in which certain of the blades will be finish-cutting blades and other blades will be rough-cutting blades and the rough-cutting blades will be so arranged as not to interfere with or affect the operation of the finish-cutting blades.

Other objects of the invention will be apparent hereinafter from the specification and from the recital of the appended claims.

Various methods may be employed for producing a pair of gears according to this invention. Preferably, however, the gear is cut in a "single cycle" operation with a face-mill gear cutter that has a plurality of cutting blades or teeth arranged part-way around its periphery with a gap between the last and first blades so that the gear may be indexed when this gap is abreast of the blank and without relative withdrawal of the work from the cutter. Both sides of a tooth space of the blank may be cut simultaneously or one side cut at a time.

When the gear is form-cut, the pinion is preferably generated conjugate to a gear whose axis makes a slightly different angle with the axis of the pinion blank from the angle between the axes of the gear and pinion when the pair are in mesh. This method of generation produces the relief on the profiles of the pinion teeth which is desired in order to obtain less than full profile contact when the gears are in mesh. The opposite sides of the pinion teeth are preferably cut with radii of curvature different from the radii of curvature of the mating tooth surfaces of the gear so that the pair will have a desirable lengthwise localization of tooth bearing in mesh.

The pinion is also preferably cut with a "single-cycle" cutter but in a generating operation. A face-mill gear cutter is preferably used that has a plurality of roughing blades followed by a plurality of finishing blades arranged part-way around its periphery with a gap between the last finishing blade and the first roughing blade. The cutter is rotated on its axis and the cutter and work are rolled together to generate the tooth surfaces of the pinion and when the gap in the cutter is abreast of the blank, the blank is indexed without withdrawing the blank relatively from the cutter.

Both gear and pinion are preferably cut with teeth tapering in depth from one end to end and preferably cut two tooth sides simultaneously. The tool used in cutting the gear may have opposite side cutting edges of different pressure angles but the tool employed in cutting the pinion will preferably have its opposite finishing cutting edges, at least, of equal pressure angle. Preferably the pressure angle of the opposite side cutting edges of the pinion cutter will be greater than the pressure angle of the tooth surfaces to be cut and tooth surfaces of the desired pressure angle will be produced on the pinion by rolling the pinion blank and cutter together as though the pinion were rolling with a surface outside of its pitch surface on the pitch surface of the basic gear represented by the cutter. This reduces the amount of roll required to generate the pinion teeth, and moreover enables opposite sides of the pinion tooth spaces to be cut simultaneously with the correct amount of taper in depth from one end of the tooth spaces to the other.

The pinion cutter is preferably made so that it has rough-cutting edges which will project beyond its finish-cutting edges at different points in the generating roll motion and will remove stock from the tooth spaces at points which do not interfere with the finishing cut. This makes a more efficient cutter and at the same time does not alter the finish produced by the finish-cutting edges. The finish-cutting edges are also elongated so that despite their high pressure angles they will completely finish the tooth surfaces to be generated.

Cutters for carrying out this feature of the invention may be made in various forms. In one embodiment of the invention, each blade has a straight finishing edge for a part of its height and a protruding roughing edge for the remainder of its height. The finishing edges all have the same inclination to the axis of the cutter, but the protruding roughing edges have varying inclinations to the axis of the cutter. The protruding roughing parts of the blades cut only parts of the tooth spaces that are not reached by the finish-cutting edges. In another embodiment of the invention, separate roughing and finishing blades are provided and the roughing blades are alternated with the finishing blades.

Figure 1:
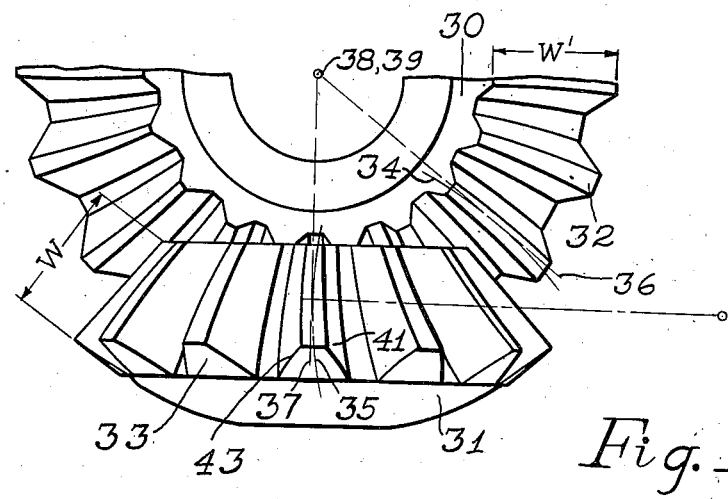
Fig. 1 is a fragmentary plan view and Fig. 2 a side elevation of a pair of gears produced according to this invention.
Figure 2:
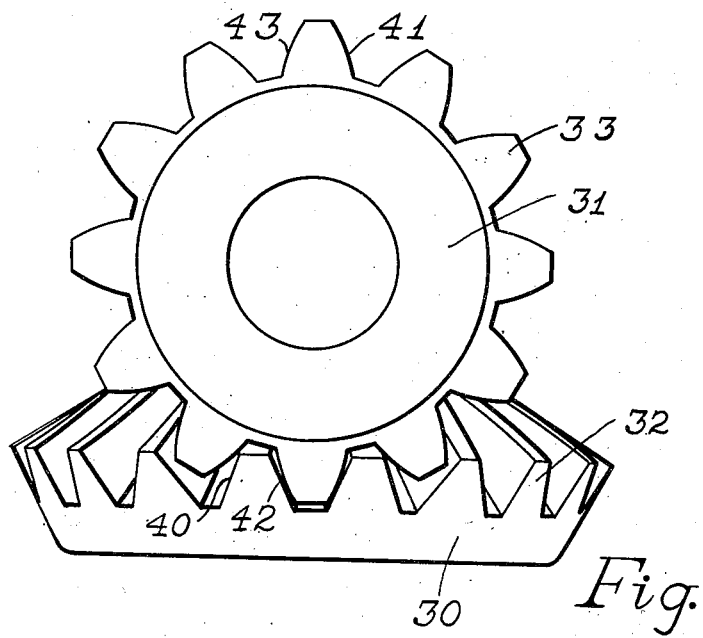

Reference will now be had to the drawings for a more detailed description of the invention. 30 and 31 (Figs. 1 and 2) denote the two members of a pair of bevel gears constructed according to one embodiment of this invention. The two gears have longitudinally curved teeth, 32 and 33, respectively, which are of zero spiral angle at approximately the center of the face of the gears. Thus, as shown in Fig. 1, the line 36, which is radial of the cone center 38 of the gear is tangent to a median line 34 of a tooth 32 of the gear at a point approximately at the center of the tooth face of the gear. Likewise, the median line 35 of a pinion tooth 33 is tangent to a line 37 which is radial of the pinion apex 39, at a point approximately midway of the face of the pinion.

The teeth of both the gear and pinion are curved on very large radii of curvature, the radii of curvature being more than twice the width of face W or W', respectively, of the teeth of gear or pinion. The result is, as clearly shown in Figs. 1 and 2, the gears have teeth which for their length of face approximate very closely straight teeth.

Both members of the pair may be generated. Preferably, however, only the pinion is generated and the gear or larger member of the pair is form-cut, that is, non-generated. Preferably, it is provided with teeth whose opposite sides 40 and 42 are of straight profile and conical surfaces of revolution.

Figure 4:
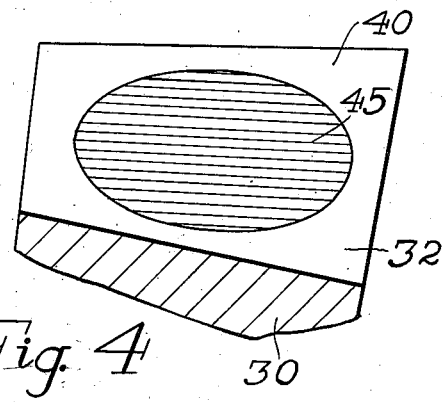
Fig. 4 is a diagrammatic view showing the tooth surface of one member of a pair of gears produced according to this invention and illustrating the localized tooth bearing of the gears when they run in mesh.

The teeth of both the gear and pinion are made to taper in depth from their large to their small ends, as clearly shown in Figs. 4 and 7, and as will be referred to more particularly hereinafter.

Figure 3:
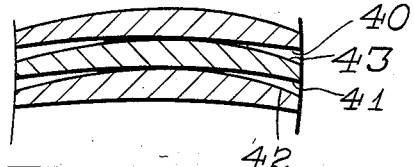
Fig. 3 is a diagrammatic view illustrating the lengthwise mismatch of the mating tooth surfaces of a pair of gears produced according to this invention.

To provide a suitable localization of lengthwise tooth-bearing, the mating tooth surfaces of the two members of the pair are curved along slightly different radii of curvature. Thus, as shown in Fig. 3, which is an enlarged view showing a pinion tooth in mesh with two teeth of the gear and somewhat diagrammatic, the sides 41 of the pinion teeth are of slightly larger radius of curvature than the mating sides 42 of the gear teeth and the sides 43 of the pinion teeth are of slightly smaller radius of curvature than the mating sides 40 of the gear teeth. This mismatch in lengthwise tooth curvature provides a localization of lengthwise tooth bearing, as indicated diagrammatically in Fig. 4 which shows the side 40 of a gear tooth. The tooth bearing or contact between this side of a tooth and the mating tooth surface of the pinion, as indicated by the shaded area 45 does not extend along the full length of the tooth but fades out toward the ends of the tooth. This localization of lengthwise tooth bearing permits the gears to accommodate themselves readily to the variations in load and in mountings which are met with in use.

Figure 6:
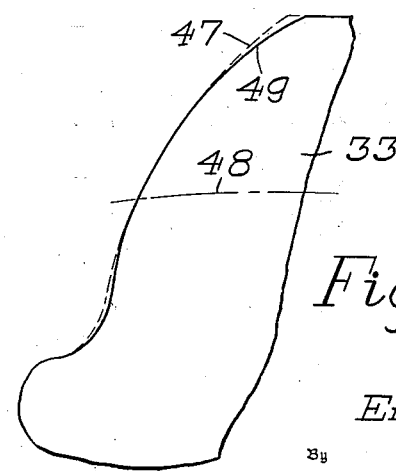
Fig. 6 is a diagrammatic view showing how the profile shape of the pinion tooth is modified by this method of generation.

Further than this, the teeth of the pinion are preferably not made fully conjugate to those of the gear, but are slightly relieved at the tops and bottoms of the tooth flanks to provide a suitable localization of profile bearing. This is clearly shown in Fig. 6 where one of the pinion teeth 33 is illustrated on a greatly enlarged scale. The dotted line 47 denotes the profile of a pinion tooth which is fully conjugate to the teeth of the gear, while the full line 49 indicates the actual profile of a pinion tooth made according to the preferred embodiment of this invention. It will be seen that the actual profile 49 departs from the theoretical profile 47 at the top and bottom of the tooth. This results in a localization of profile tooth bearing, when the pinion runs in mesh with the mate gear, less than full profile bearing being obtained, as shown in Fig. 4. The bearing does not extend to the top or to the bottom of the teeth. This makes for quietness in operation and enhances the advantages inherent in the longitudinally curved tooth construction. In Fig. 6, the line 48 denotes the pitch line of the pinion tooth or a line approximately midway the height of the tooth.

Various methods may be employed for producing the gear or larger member of the pair according to this invention. If both members of the pair are generated, the gear may be produced according to any of the known processes of generating spiral bevel gears, a cutter of large diameter being employed. If the gear has formed tooth profiles, it may be cut also according to any of the known processes for cutting "Formate," that is, non-generated longitudinally curved tooth gears, a cutter of large diameter being simply employed to produce the requisite lengthwise tooth curvature.

The gear teeth may be roughed out first and then finish-cut in a separate operation, but preferably the gear teeth are finished directly from the solid in a single operation. One process for accomplishing this is illustrated in the pending application of Leonard O. Carlsen, Serial No. 130,139, filed March 10, 1937. In this process, a face-mill gear cutter of large diameter is employed and the two sides of a tooth space of the gear are roughed and finished in a single turn of the cutter. The cutter has two successive series of cutting blades or teeth which are made to cut, respectively, at slightly different radii and a tooth slot is roughed out and has one side finish-cut by the first series of blades to pass through the slot. Then the gear blank is set over, that is, slightly rotated on its axis and the opposite side of the tooth slot is roughed out and finish-cut as the second series of cutting blades or teeth pass through the tooth slot. The blades or teeth of the cutter are arranged only partway around the periphery of the cutter and there is a gap between the last blade and the first blade and the gear is indexed when this gap is abreast of the gear blank in the rotation of the cutter. Thus, when the cutter as made as many revolutions as there are tooth spaces in the gear being cut, the gear will have been finished. The set over of the blank during the cutting of each tooth space is determined by the width of the tooth space to be cut and the angle through which the blank is rotated for this set-over corresponds to the width of the tooth space at the middle of the gear face. To permit of this set-over, the cutter is provided with a short peripheral gap between the first and second series of cutting blades or teeth. Since this method of cutting a gear is fully described in the Carlsen appplication above mentioned, it need not be referred to in further detail here.

Another, and at present preferred method of cutting the gear is to cut both sides of each tooth space of the gear simultaneously in a single position of the blank. This conforms to standard practice in cutting other longitudinally curved tooth gears and any "spread blade" type of face-mill gear cutter of suitable diameter may be employed in the finish-cutting of the gear. Preferably, however, a face-mill gear cutter of the "single-cycle" type is used, having a plurality of roughing blades followed by one or more finishing blades and having a gap between the last finishing blade and the first roughing blade to permit of indexing the blank when this gap is abreast of the blank in the rotation of the cutter.

In cutting the teeth of both gear and pinion, it is desirable to cut the teeth so that the sides and bottoms of the tooth spaces will converge as closely as possible at the gear or pinion apex. This construction gives for any bevel gear a maximum of tooth strength at all points along the length of the teeth.

Figures 7, 8:
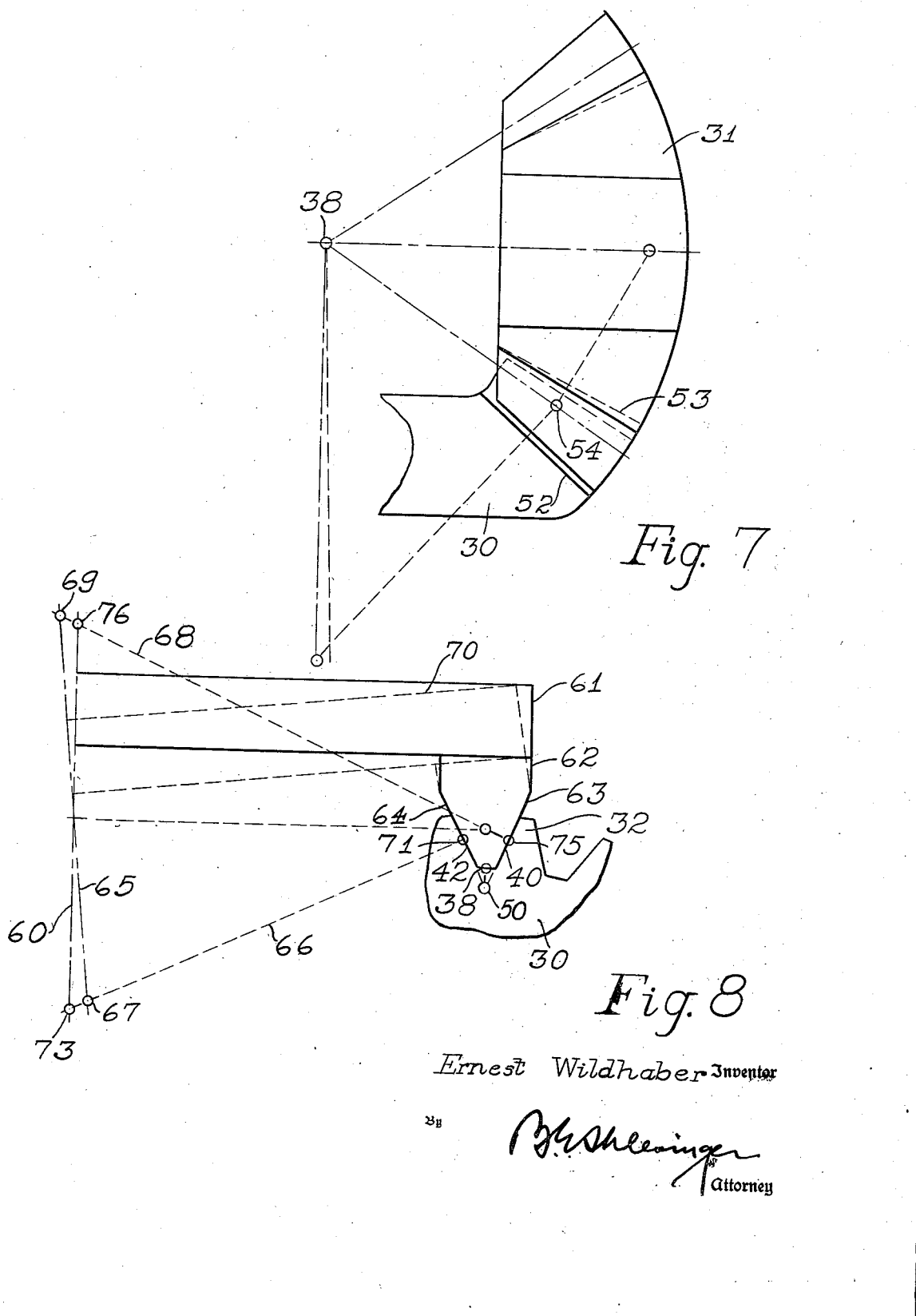
Fig. 7 is a diagrammatic view illustrating certain relationships between the members of a pair of gears produced according to this invention.
Fig. 8 is a diagrammatic view illustrating the preferred method of cutting the gear or larger member of the pair according to this invention.

In Fig. 8, a fragment of the gear 30 is shown. This view is taken along a root cone element of the gear and the apex 38 of the gear appears on the bottom of the tooth space and at a slight distance from the sides 40 and 42 of the space. This distance is a measure of the departure of taper of the tooth space from natural taper, that is, from a taper in which the bottom 52 of the tooth space runs to the cone apex 38. In the gear shown, the straight sides 40 and 42 of a tooth space of the gear intersect, if extended, in a point 50 which does not lie in the tooth bottom but below said bottom.

Natural taper in width of the tooth spaces, or any other taper may be obtained by slightly altering the root angle of the blank, as known. Such an alteration is indicated for the pinion in Fig. 7 by the dotted line 53 which indicates how the tooth depth of the pinion tooth spaces may be modified to obtain the desired taper. To obtain natural taper in width of the gear teeth, the direction of the cut at a point 54 midway of the face of the gear teeth should be such that the tangent to the line of convergence of the sides of the gear teeth, that is, the tangent at the point 50 will pass through the gear apex 38.

In Fig. 8, 60 denotes the axis of a single cycle face-mill gear cutter 61 whose cutting blades or teeth 62 have side-cutting edges 63 and 64 of equal pressure angle, that is, of equal inclination to the axis 60 of the cutter which is positioned so that the axis 60 is at right angles to a plane tangent to the root surface of the gear, as is customary in gear cutting practice. The cutter is of large diameter to produce the desired lengthwise tooth shape on the gear teeth and on account of its large diameter, as compared with the face-width of the gear, would produce a tooth of slight lengthwise curvature, that is, almost straight. Therefore, we would ordinarily obtain hardly any localization of lengthwise tooth bearing.

To obtain a localized lengthwise tooth bearing of any desired length, however, a gear cutter 70 having an axis 65 may be used. This axis intersects the normal 66 to the inside cutter surface in a point 67 and the normal 68 to the outside cutter surface at a point 69. Inasmuch as the normal radius 71—67 of the inside cutter surface is smaller than the radius 71—73 of the cutter 61, the cutter 70 will cut away or relieve the ends of the convex tooth surfaces 42 of the gear, and since the normal radius 75—69 of the outside surface of the cutter 70 is larger than the normal radius 75—76 of the outside surface of the cutter 61, the cutter 70 will also relieve or cut away the tooth ends of the concave surfaces 40 of the gear. Thus, tooth surfaces may be produced on the gear which will have a desired localization of lengthwise tooth bearing when run with the mating tooth surfaces of the pinion.

The cutter 70 has a larger blade angle on the outside and a smaller blade angle on the inside, that is, the outside cutting edges 63 of this cutter have a greater inclination to the axis 65 of the cutter than have the inside cutting edges 64. This is contrary to usual practice for cutting bevel gears since ordinarily a cutter having opposite side cutting edges of equal pressure angle is employed. No additional machine adjustments are required, however, to use a cutter such as shown at 70 to cut spiral bevel gears in a forming, that is non-generating operation.

It is preferred to use the cutter with the different blade pressure angles in cutting the gear rather than the pinion. If a cutter having unequal blade angles were used in a generating process an additional cutter tilt or cutter setting would have to be provided upon the gear generating machine. Hence, it is preferred to make the pinion cutter with opposite side cutting edges of equal pressure angle or inclination to the axis of the cutter.

Figures 9, 10:
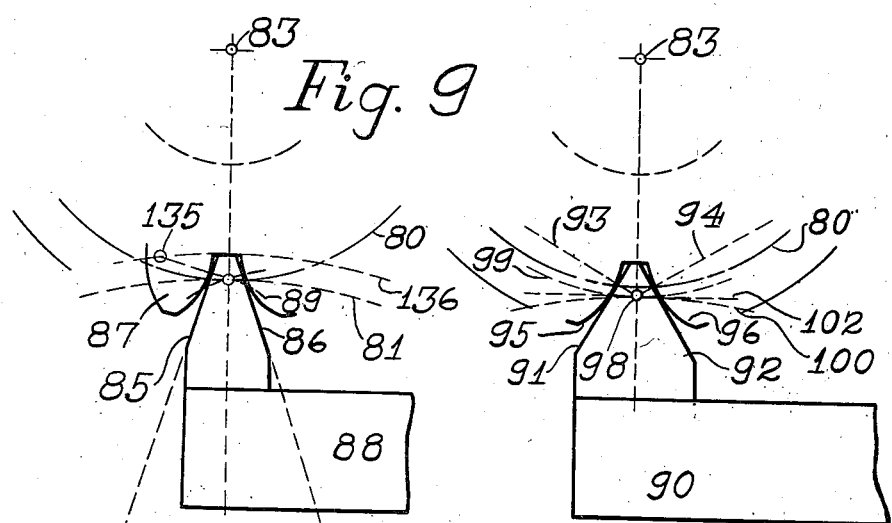
Fig. 9 is a diagrammatic view, showing how the pinion or smaller member of the pair may be cut with a tool having a pressure angle equal to the pressure angle to be produced on the pinion teeth.
Figs. 10, 11 and 12 are diagrammatic views illustrating various methods of cutting the pinion with a tool having a larger pressure angle than the pressure angle of the pinion tooth surfaces to be cut.

The pinion 31 may be generated conjugate to the gear 30 by rolling the pinion blank with reference to a cutting tool representing a tooth of the gear, as though the pitch surface 80 of the pinion were rolling on the conical pitch surface 81 of the gear, as shown in Fig. 9. In this figure, 83 denotes the axis of the pinion and 84 the axis of the gear. The opposite side cutting edges of a cutter 88 which represents a tooth of the gear are denoted at 85 and 86, respectively, and the teeth cut upon the pinion, when the cutter is rolled with the pinion blank, are denoted at 87. The pressure angles of the cutting edges 85 and 86 correspond to the pressure angles of the tooth surfaces to be generated upon the pinion teeth.

It is preferred, however, in cutting the pinion to use a tool of increased pressure angle so that both sides of a tooth space of the pinion may be generated simultaneously correctly without the necessity of materially altering the taper of the pinion teeth from end to end. By using a cutter whose side cutting edges have a larger pressure angle than the pressure angle of the tooth surfaces to be generated on the pinion, the desired lengthwise taper in depth of the pinion teeth can be obtained and still both sides of a tooth space of the pinion can be cut simultaneously.

Fig. 10 illustrates one method of cutting the pinion teeth with a tool of increased pressure angle. The tool is designated at 90. The pressure angles of its side cutting edges 91 and 92 are greater than the pressure angles of the tooth surfaces to be generated upon the pinion. The normals 93 and 94 at the points of contact between the pinion tooth profiles 95 and 96, respectively, and the straight cutting edges 91 and 92, respectively, of the tool intersect at a point 98 which is outside the pitch circle 80 of the pinion and which determines the position of the instantaneous axis for the generating roll. The generating roll, when this cutter 90 is employed, consists in rolling the pinion blank with the cutter, while the cutter is rotating on its axis, as though the pinion blank were rolling with a conical surface 99, which lies outside of its pitch surface and passes through the point 98, on a conical surface 100 of a basic gear, which is similar to the mating gear except for the pressure angles of its tooth surfaces.

If the mating gear has generated tooth surfaces instead of formed tooth surfaces, the pinion teeth are generated by rolling the pinion blank on the pitch surface 102 of an actual or nominal crown gear.

The tool shown in Fig. 10 will cut opposite sides of a tooth space simultaneously and to more nearly proper tapering depth than the tool 88 shown in Fig. 9, because the sides 91 and 92 of the tool 90 converge at a point which is closer to the root surface of the pinion than the point of convergence of the sides 85 and 86 of the tool 88.

Figure 11:
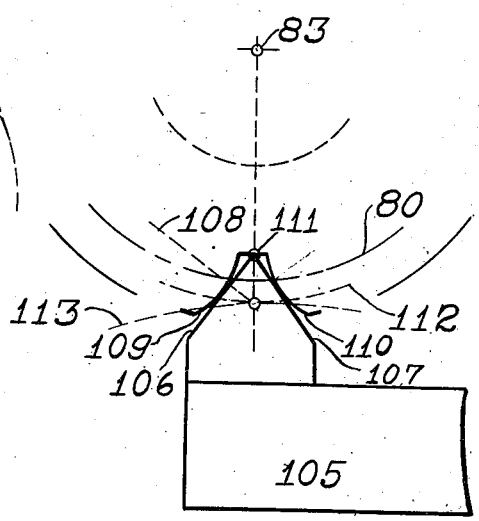

Fig. 11 illustrates use of a tool 105 which is capable of cutting both sides of a tooth space of the pinion simultaneously while producing natural taper in depth of the tooth space from end to end without changing the root line of the pinion at all. The tool 105 has opposite side cutting edges 106 and 107 which converge in a point 111 which lies on the root surface of the pinion. The normal to the side surface 106 of the cutting tool is denoted at 108. Tooth surfaces 109 and 110 of the desired pressure angle are produced on the pinion by rolling the pinion with the tool as though the pinion were rolling with a surface 112, that is outside of its pitch surface 80, on the pitch surface 113 of a basic gear represented by the tool.

Figure 12:
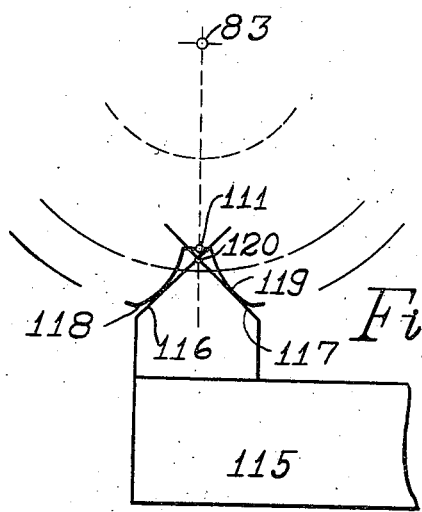

Fig. 12 shows a tool 115 for cutting simultaneously opposite sides of a tooth space, which will have more than natural taper in width from one end to the other. Here the tool 115 has opposite side cutting edges 116 and 117 which are of much greater pressure angle, that is, inclination to the axis of the cutter than the tooth surfaces 118 and 119 that are to be cut upon the pinion. The sides 116 and 117 of the tool converge, in fact, at a point 120 which lies outside of the projected pinion apex 38. Again, tooth surfaces of the requisite pressure angle are produced upon the pinion by rolling the pinion with the tool as though the pinion were rolling with a surface outside of its pitch surface upon the pitch surface of a basic gear represented by the tool.

When a tool of increased pressure angle is used, the "Formate" gear as well as the pinion may be cut with "spread-blade" cutters, that is, two side tooth surfaces simultaneously, while avoiding modification of the root lines of the pair. The tooth sides of the gear (Fig. 8) are then cut with less than natural taper from end to end and the lack of taper is made up on the pinion. The spiral angles of the tooth surfaces of the pair, that is, the tooth directions are properly matched when the normal distance of the projected pinion apex 111 from the straight-cutting edges 116 and 117 is the same as its normal distance from the straight tooth profiles 40 and 42 of the mate gear (Fig. 8).

Preferably, a tool is used that has side cutting edges which converge in a point that coincides with the projected pinion apex, as shown in Fig. 11, and if the gear is cut with less than natural taper, that is compensated for by modifying the root line of the pinion as indicated at 53 in Fig. 7, to cut the pinion tooth spaces deeper than usual at their outer ends. The tools for cutting the pinion according to the methods disclosed in Figs. 11 and 12 may be shaped so as to reach deep enough into the tooth spaces of the pinion blank to completely cut the same, as will be described more fully hereinafter.

When tools of different pressure angle (included angle between their opposite side cutting edges divided by 2) are used on the two members of a gear pair, the diameters of the cutters for cutting the two members of the pair should be in the proportion of the cosines of the pressure angles of the two cutters.

Figure 5:
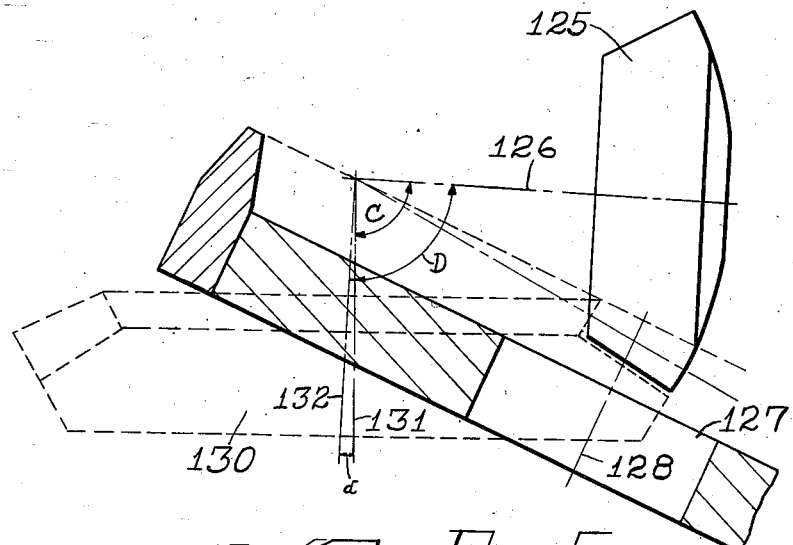
Fig. 5 is a diagrammatic view illustrating the preferred method of generating a pinion according to this invention.

In order to provide the desired localization of profile tooth bearing between the two members of the pair, as described with reference to Fig. 6, the pinion is preferably generated conjugate to a basic gear whose axis is inclined at a slightly different angle to the axis of the pinion blank from the angle between the axes of the pinion and its mate gear when the pair are in mesh. This method of generation is illustrated diagrammatically in Fig. 5. The pinion blank to be cut is denoted at 125. Its axis is at 126. The cutter for cutting the pinion teeth is denoted at 127. Its axis is at 128. This cutter is positioned relative to the pinion blank so that it represents a conical gear 130 whose axis 131 is inclined to the axis 126 of the pinion blank at an angle C which is less than the angle D between the axis of the pinion and the axis 132 of its mate gear when the pair are in mesh. The angle $d$ which is the difference between the two angles is ordinarily less than the dedendum angle of the pair. The tooth surfaces of the pinion are generated by rotating the tool on its axis 128 while producing a relative rolling movement between the pinion blank and the tool as though the pinion blank were rolling upon the gear 130 represented by the tool. When the pinion is generated in this way, tooth surfaces will be produced on the pinion which will be relieved on the tops and the bottoms of the tooth profiles, as indicated in Fig. 6.

The preferred method of cutting gears in a generating process according to this invention and the preferred form of cutter to be employed will now be described. The principles to be outlined refer to the use of face-mill gear cutters of the "single-cycle" type and apply to the generation of pinions, which are to mesh with either generated or non-generated gears and to the generation of gears which are to have generated tooth surfaces and mesh with generated pinions. For convenience, the preferred method and form of cutter will be described as applied to the generation of the pinion.

Figure 16:
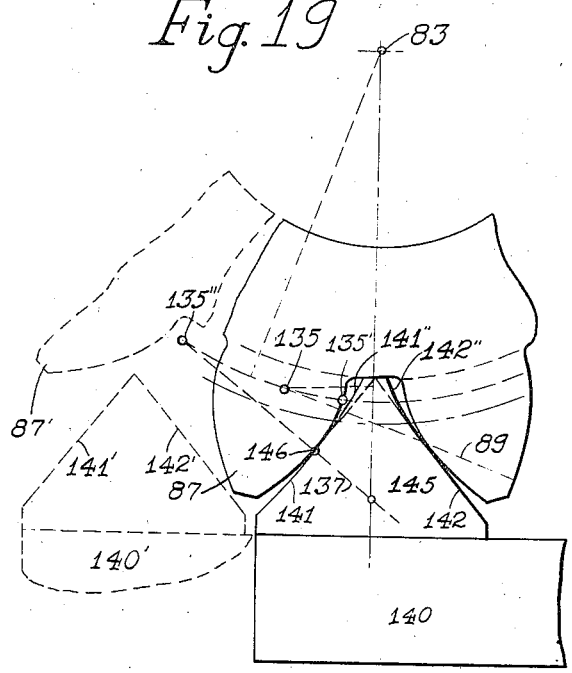

From Fig. 9, it will be seen that the action of the pinion teeth with the teeth of the mate gear terminates at a point 135 which may be determined in the usual manner by drawing the outside or tip surface 136 of the gear and intersecting it with the line of action 89 between the gear and pinion. In Fig. 16, the point 135 corresponds to the point 135 of Fig. 9. From Fig. 16, it will be seen that the pinion profile must be generated at least as far as the point 135' which lies on the pinion tooth profile at the same radial distance from the pinion axis 83 as the point 135.

When the tooth surfaces of the pinion are generated with a tool whose cutting edges are of greater pressure angle than the tooth surfaces to be cut upon the pinion, the mesh and final cut between the tool and pinion takes place along a line of action 137 which is steeper than the line 89. In Fig. 16, two positions of a pinion tooth are shown. The position shown in full lines and designated at 87 is the position of the tooth at approximately the center of the generating roll and the position shown in dotted lines at 87' is the position of the tooth near one end of the roll.

If a cutting tool 140 that has straight side cutting edges 141 and 142 of larger pressure angle than the pressure angles of the tooth surfaces to be generated upon the pinion, is employed, it will be seen that a point 135'' at one end of the line of action 137 between the tool and the pinion, which is at the same radial distance from the axis 83 of the pinion as the point 135' will be out of reach of the straight cutting edges of the tool at the end of the roll, at least, if the tool pressure angle is much larger than the running pressure angle of the gear pair. If a tool 140 having straight cutting edges is employed, then, the tooth profile of the pinion will not be generated to the desired depth.

I have found, however, that this condition can easily be remedied in "single-cycle" operations where the cutter makes one revolution in a complete generating cycle, that is, where the pinion blank completes the generating roll during one revolution of the cutter. All that we have to do is to add to the cutting profiles of the cutter at such parts as do not interfere with the generating cut. In this way, stock may be completely removed from the tooth spaces of the blank despite the fact that a cutter is being used which has cutting blades of greater pressure angle than the pressure angle of the tooth surfaces being cut.

Thus, the cutting blade 145 of the cutter 140, which is to cut at the center of the generating roll, may have its cutting profiles curved outwardly at its tip, as shown in Fig. 16, to provide tooth cutting profiles 141'' and 142'', respectively. Thus, more stock may be cut from the bottom of the tooth space of the pinion blank in the center of the roll than would be cut by a blade having simply straight profiles 141 or 142. This added cutting portion of the blade 145 will not affect the finishing cut, because at the center of the roll, the finishing cut is taken by the cutting edge 141 at the point 146 on the line of action 137 and by a corresponding point on the cutting edge 142 and these portions of the modified cutting profiles of the blade will remain straight.

Again, the cutting blade or tooth 150 which operates at one end of the roll, may have its cutting profile modified so that instead of this blade having straight side cutting edges 151 and 152 which intersect at a point 153, the blade may be shaped as shown in full lines so that one side cutting edge of the blade is curved, as denoted at 154 to follow closely the profile curvature of the pinion tooth at this point in the roll. The other side cutting edge 151 may be extended to the point 153' so that the cutting blade or tooth will cut to the maximum depth. It will be noted that here one side cutting edge 151 of the blade 150 is maintained straight and simply extended. This is because a finishing cut on the profile 146 of the pinion tooth at this point in the roll will be taken by the cutting blade at the point 153'.

Figure 17:
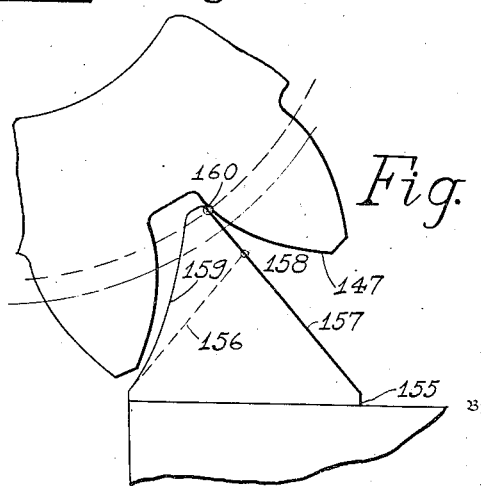

Likewise, an additional cutting portion may be added to the blade 155 of the cutter which is adapted to cut at the opposite end of the generating roll (Fig. 17). Here, instead of using a cutting blade that has two straight side cutting edges 156 and 157 which intersect at a point 158, a cutting blade or tooth is employed which has a curved cutting edge 159 and has the cutting edge 157 extended to a point 160, where it takes a final finishing cut on the profile 147 of a tooth of the pinion. This cutting blade 155, which cuts at one end of the roll, as will be seen, is symmetrical to the cutting blade 150 which operates at the other end of the roll.

Figure 15:
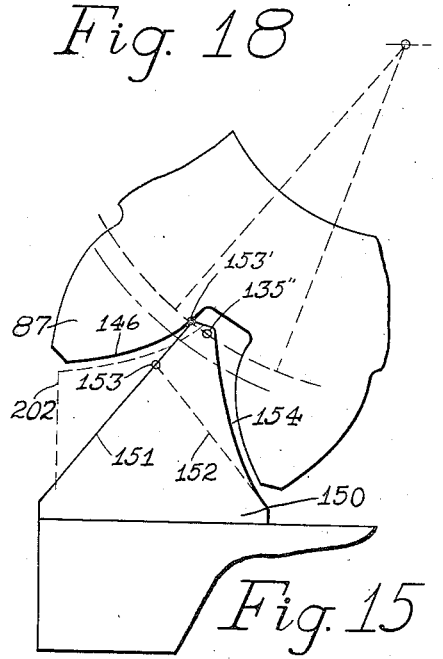
Figs. 15, 16 and 17 are diagrammatic views illustrating the construction of this cutter and how it operates at one end, at the center, and at the other end of the generating roll.

But three cutting blades or teeth of the cutter are shown in Figs. 15, 16 and 17. Other intermediate blades of the cutter will have added cutting portions which vary progressively in shape and the profile shapes of the blades will change gradually from one blade to another to prevent excessive cutting stresses and unequal blade wear. The cutting portions added to the different blades will strengthen the blades at their tips and also enable the blades to properly form the tooth bottoms of the pinion tooth spaces.

In view of the large pressure angle of the finishing portions of the cutter blades or teeth, an ample front rake or hook of say 20° is sufficient to provide keen side cutting edges on both sides of the blades and it is not necessary to sharpen the front faces of the blades with side rake. All of the blades may, therefore, simply be sharpened with a front rake or hook and may be made to cut on both sides simultaneously. This not only increases production but also simplifies the sharpening operation.

Figures 13, 14:
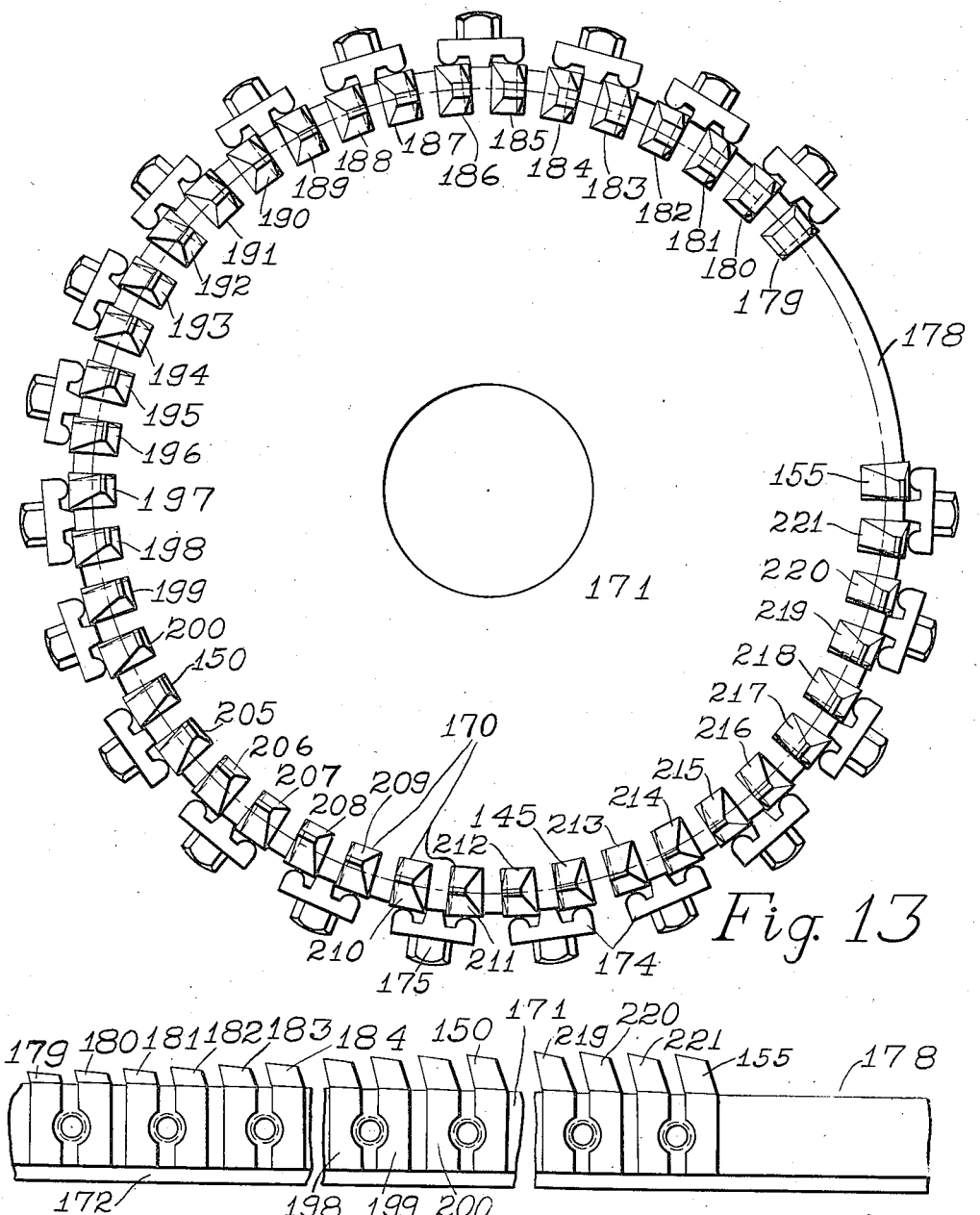
Figs. 13 and 14 are a plan view and a developed side elevation, respectively, of a cutter made according to one embodiment of this invention for cutting the pinion or generated member of the gear pair.

A "single-cycle" cutter constructed to carry out this embodiment of the invention is illustrated in Figs. 13 and 14. The cutter has a plurality of inserted cutting blades 170 that are mounted in blade-receiving slots that are formed in the periphery of the rotary head 171. The bottom faces of the blades seat upon a plate or ring 172 that is secured in any suitable manner to the back-face of the head. The blades are secured in their slots by clamps 174. Each clamp is adapted to engage and hold two blades and is secured in clamping position by a bolt 175. This method of clamping blades in the cutter head is already known in the art and need not further be described here.

The blades are arranged only part-way around the periphery of the head and there is a gap 178 between the last blade 155 of the cutter and the first blade 179. The cutter is adapted to be positioned relative to the blank being cut so that it will cut the tooth spaces of the blank without any relative depthwise feed movement between the cutter and blank and the blank is indexed when this gap is abreast of the blank in the rotation of the cutter. It is unnecessary to withdraw the cutter relatively from the blank to permit of the indexing. The relative feed of the cutter into depth may be achieved by the relative rolling movement between the cutter and blank, the rolling movement being used to roll the tooth surfaces of the blank into full depth engagement with the cutter and then out of engagement again, as will be understood by those skilled in the art. Preferably, however, the cutter is provided with a plurality of roughing blades, which precede the finish-cutting blades and which are of reduced height, as compared with the height of the finishing blades and which increase gradually in height up to the full height of the finishing blades as the limit. This type of cutter is illustrated in the drawings. With this type of cutter, the blank may be held stationary while the successive roughing blades are moving through a tooth slot of the blank and the rolling movement may be started only after the tooth space has been roughed out to full depth.

In the drawings, the roughing blades are designated at 179 to 200 inclusive. These blades increase successively in height, as clearly shown in Fig. 14 until they reach the full depth of the finished tooth surfaces of the pinion as the limit.

The roughing blades may be shaped in various ways. Thus, the first roughing blades may be of equal pressure angle on opposite sides and simply of gradually increasing height, as are the roughing blades 179 to 186 inclusive, in Fig. 13 and then succeeding roughing blades may be made with gradually increasing pressure angle at the outside and gradually decreasing pressure angle at the inside, as shown in this figure, so as properly to rough out the tooth slot ahead of the first finish-cutting blade 150, which is of the shape shown in full lines in Fig. 15.

The roughing blades may also be made so that they not only vary in height, but conform more closely to the finished shape of the tooth slots to be cut. Thus, as indicated in Fig. 15, the final roughing blade might have the shape at one side denoted by the dotted line 202 so as to rough out the tooth slot more closely to finished shape.

When a cutter of the type shown in Figs. 13 and 14 is used, the blank is held stationary while the roughing blades 179 to 189 are cutting. Then the cutter and blank are rolled relative to one another in one direction while the roughing blades 190 to 200 are cutting and then the roll is reversed and during the return roll the finishing blades 150 to 155 take their cuts. The inside cutting edges of the finishing blades are offset radially inwardly and the outside cutting edges are offset radially outwardly with respect to corresponding cutting edges of the roughing blades so as to effect the finishing cuts.

The finishing blades 150 to 155, as already described, have straight cutting edges for that portion of their height which takes the finishing cut and have projecting portions extending beyond the finish-cutting edges at points not reached by the finish-cutting edges in the generating roll so as to remove the stock from the tooth spaces and cut properly rounded tooth space bottoms. The shapes of the finishing blades vary because of the variation in shape of these projecting portions of successive blades. There is a progressive variation in shape on one side of the blades from the first blade 150 to the blade 145, which cuts at the center of the roll, and a progressive variation in shape on the other side of the blades from the blade 145 to the blade 155 which cuts at the opposite end of the roll. Blades intermediate the first finishing blade 150 and the central finishing blade 145 are numbered from 205 to 212 inclusive, and blades intermediate the central finishing blade 145 and the final finishing blade 155 are numbered 213 to 221 inclusive.

Instead of making the finishing blades with curved projecting portions, as shown in Figs. 15 to 17 inclusive, all of the blades may be made of straight profile shape and alternate blades may have straight profiles whose inclination to the axis of the cutter varies uniformly so as to achieve the same purpose as is sought with the cutter having blades such as shown in Figs. 15 to 17 inclusive. The intermediate blades may have side cutting edges of uniform pressure angle to cut the finished tooth surfaces.

Figure 18:
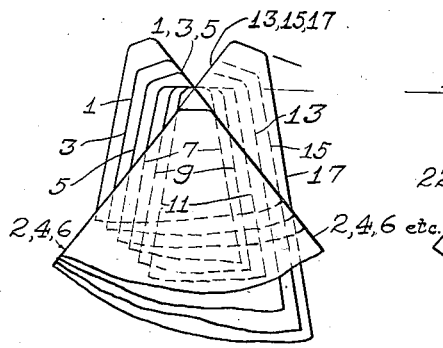
Fig. 18 is a diagrammatic view illustrative of a modified form of pinion cutter and showing the various blades of this cutter superimposed upon one another.
Figure 19:
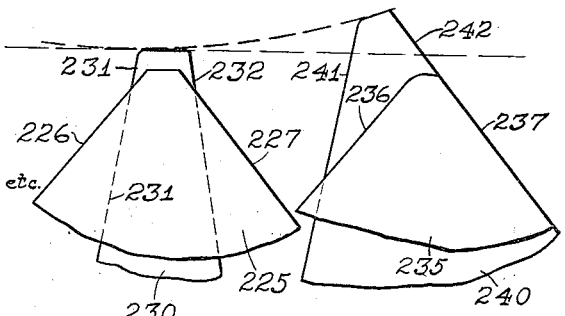
Fig. 19 is a diagrammatic view showing further how the roughing blades of the cutter illustrated in Fig. 18 vary in shape corresponding to the positions in the generating roll at which these blades are to operate.

Such an arrangement of blades is indicated more or less diagrammatically in Figs. 18 and 19. 225 denotes a cutting blade for finishing opposite sides of the tooth slot at the center of the roll. This cutting blade has opposite side-cutting edges 226 and 227 which are of equal pressure angle and of considerably larger pressure angle than the tooth surfaces of the pinion to be cut. The side cutting edges 226 and 227 perform the same work as is performed by the straight portions of the side cutting edges 141 and 142 of the blade 145 shown in Fig. 16. The blade 225 is preceded by or followed by a blade 230 which has side cutting edges 231 and 232 which are of much smaller pressure angle than the side cutting edges 226 and 227 of the blade 225. The blade 230 is made, however, so that it projects beyond the blade 225 in the direction of tooth depth. The outermost portions of the side cutting edges 231 and 232 therefore perform substantially the same function as is performed by the curved portions 141'' and 142'' of the blade 145 of Fig. 16. They remove stock from the tooth spaces at the center of the roll at a point not reached by the side-cutting edges 226 and 227 of the blade 225.

At one end of the roll, the cutting is done by a pair of blades 235 and 240. The blade 235 has opposite side cutting edges 236 and 237 whose pressure angle is equal to the pressure angle of the opposite sides 226 and 227 of the blade 225. The blade 240 has opposite side cutting edges 241 and 242 whose pressure angles differ from the pressure angles of the opposite side cutting edges of the blades 225, 230 or 235. The side cutting edges of the blade 240 extend beyond the blade 235 in the direction of tooth depth and perform substantially the same function as is performed by the projecting portions of the blade 155 (Fig. 17) which is adapted to cut at the same end of the generating roll.

The cutter illustrated in Fig. 19 in other words has alternate blades whose opposite side cutting edges have equal pressure angles which are greater than the pressure angles of the tooth surfaces to be generated upon the pinion and which are like the blades 225 and 235 described. Blades intermediate these blades of uniform pressure angle have varying positions in order to remove stock ahead of the finishing blades. The position of each of these intermediate blades is determined by the position of the blank in the generating roll when each of these blades takes its cut.

In Fig. 18, the blades of a cutter made according to this embodiment of the invention are shown superimposed upon one another. For the sake of convenience, the blades are numbered in their order of arrangement around the cutter head as 1 to 17 inclusive. The even-numbered blades, 2, 4, 6 etc. are like the blades 225 to 235. They are all shaped alike and have equal pressure angles on opposite sides. The odd-numbered blades alternate with the even-numbered blades and have side-cutting edges whose positions and pressure angles vary around the cutter, as described. The blades 1, 3 and 5 have different pressure angles on opposite sides but the same pressure angles on corresponding sides but their cutting edges at one side are displaced radially of the cutter relative to one another. The blades 7, 9, 11 have equal pressure angles on opposite sides but are displaced radially relative to one another. The blades 13, 15, 17 are symmetrical to the blades 1, 3 and 5.

Figure 21:
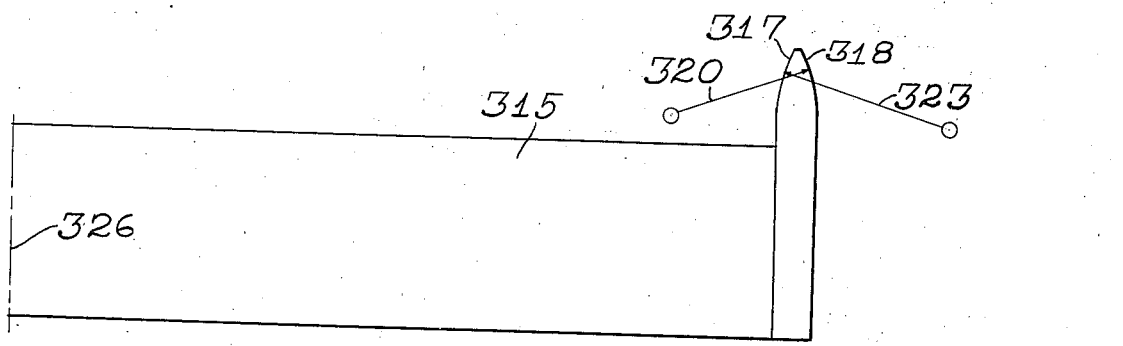
Fig. 21 is a diagrammatic view showing the profile shape of the blades of the cutter which would be employed to cut the mating pinion.
Figure 22:
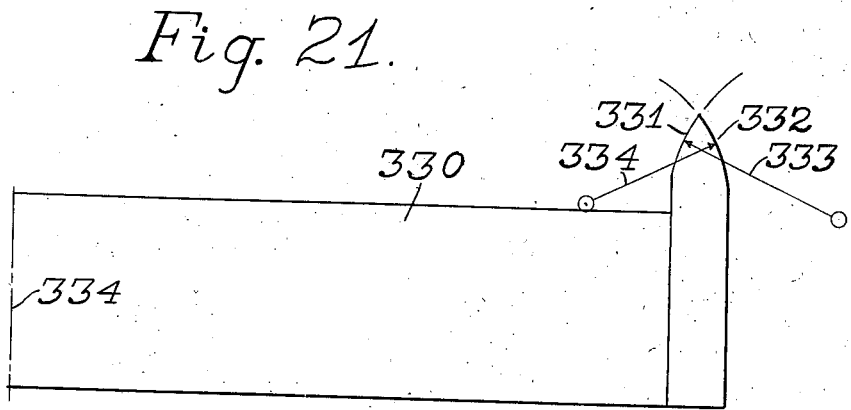
Fig. 22 is a diagrammatic view showing a modified form of pinion cutter.

When cutters having straight finish-cutting edges, such as shown in Figs. 13 to 19 inclusive, are employed for cutting gears or pinions according to the process of this invention in a generating operation, a "bias bearing" will be produced on the teeth of the mating gears unless one of the known methods of eliminating bias is employed during generation of the gear or pinion. It is possible to eliminate "bias bearing," however, by employing cutters having curved finish-cutting edges instead of straight finish-cutting edges. Cutters of this modified type are illustrated in Figs. 20 to 22 inclusive.

Figure 20:
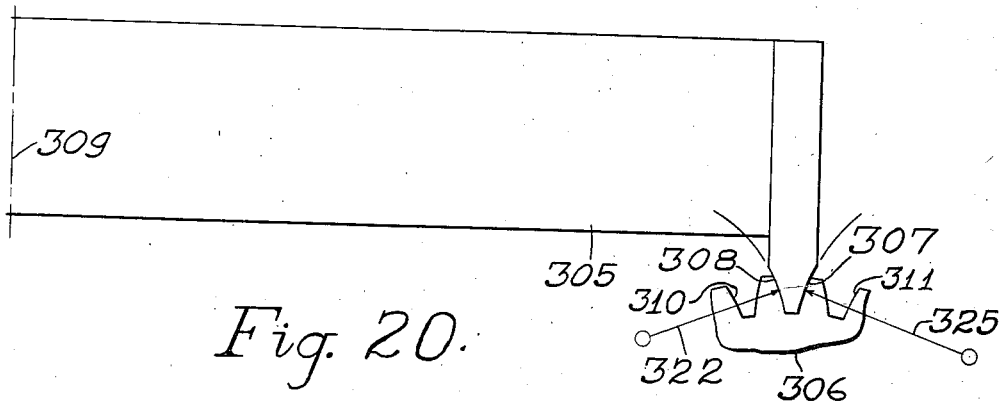
Fig. 20 is a diagrammatic view showing a form of cutter for cutting the larger member of a pair of gears according to this invention in order to eliminate "bias bearing"

In Fig. 20, a cutter 305 is shown such as might be employed in producing the gear 306 or larger member of a pair of gears according to the present invention. The cutter 305 has concavely curved cutting edges 307 and 308. Those cutting edges are curved along substantially circular arcs. The inside cutting edges 308 of the cutter are differently curved from the outside cutting edges 307, the inside cutting edges being curved on a slightly smaller radius. The curvature of the cutting profiles may be determined by assuming an average curvature. The curvature of the inside cutting profiles equals said average curvature, plus the added curvature of a spherical cutter of the same normal radius. The curvature of the outside cutting profiles equals the difference between said average curvature and the curvature of said spherical cutter. The gear cutter may be positioned so that its axis 309 is perpendicular to the root plane of the gear or the axis of the gear cutter may be inclined thereto corresponding to the inclination of the axis of the cutter 70 in Fig. 8.

The tooth profiles 310 and 311 cut upon the gear teeth, when a cutter such as shown at 305 is employed, will correspond very closely to involute tooth profiles although the gear is cut without a generating roll.

In cutting the pinion which is to mate with the gear 306, a cutter 315 is employed which has cutting blades that have convex cutting edges 317 and 318. The outside cutting edge 318 of the pinion cutter is curved on a radius 320 that corresponds to the radius of curvature 322 of the inside cutting edge 308 of the gear cutter and the inside cutting edge 317 of the pinion cutter is curved on a radius 323 which equals the radius of curvature 325 of the outside cutting edge of the gear cutter.

In generating the pinion teeth, the cutter 315 is rotated on its axis 326 while the cutter and the pinion blank are rolled relative to one another. In the generating operation, the cutter is arranged to represent a gear preferably whose axis is inclined to the axis of the pinion blank at an angle slightly different from the angle between the axis of the pinion and its mate gear when in mesh according to the principle described with reference to Fig. 5. In this way tooth surfaces will be generated upon the pinion which will have less than full profile bearing when run in mesh with the teeth of the mate gear.

The pinion cutter 315 has side cutting edges 317 and 318 which are of the same pressure angle as the tooth surfaces to be cut upon the pinion. A cutter may be employed, however, for generating the pinion teeth which has side cutting edges of greater pressure angle than the side surfaces to be cut upon the pinion. Such a cutter is illustrated at 330 in Fig. 22. This cutter has side cutting edges 331 and 332 whose pressure angles or inclination to the axis 334 of the cutter is greater than the pressure angles of the tooth surfaces to be cut upon the pinion. The radius 333 of the inside cutting profile 331 of the pinion cutter corresponds, however, to the radius 325 of the outside cutting edge 307 of the gear cutter and the radius 334 of the outside cutting edge 332 of the pinion cutter corresponds to the radius 322 of the inside cutting edge 308 of the gear cutter. Where a cutter such as illustrated in Fig. 22 is employed, the cutting profiles 331 and 332 may be further modified in accordance with the principles illustrated in Figs. 15 to 17 inclusive. In other words, the pinion cutting blades may have different portions protruding beyond the finish-cutting edges in accordance with the different phases of the generating roll at which the different blades are to cut.

A number of different embodiments of the invention have been illustrated. It will be understood, however, that the invention is capable of still further modification and this application is intended to cover any variations, uses, or adaptations of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter having a plurality of cutting blades arranged part-way around its periphery with a gap between the last and first blades of sufficient angular extent to permit of indexing a gear blank, when the gap is abreast of the blank, without relative separation of the cutter and blank, said blades having finish-cutting edges and rough-cutting edges, the finish-cutting edges having a uniform inclination to the axis of the cutter and the rough-cutting edges having a progressively varying inclination to the axis of the cutter.

2. A face-mill gear cutter having a plurality of cutting blades arranged part-way around its periphery with a gap between the last and first blades of sufficient angular extent to permit of indexing a gear blank, when the gap is abreast of the blank, without relative separation of the cutter and blank, each of said blades having a finish-cutting side edge and a rough-cutting side edge which protrudes laterally beyond the finishing edge, the locations of said edges relative to one another varying progressively on the different blades.

3. A face-mill gear cutter having a plurality of cutting blades arranged part-way around its periphery with a gap between the last and first blades of sufficient angular extent to permit of indexing a gear blank, when the gap is abreast of the blank, without relative separation of the cutter and blank, alternate blades having side cutting edges of varying inclination to the axis of the cutter and the other blades having side cutting edges of uniform inclination to the axis of the cutter, the positions of the side-cutting edges of the blades of the first group varying around the cutter.

4. The method of cutting the tooth surfaces of a gear which comprises employing a face-mill cutter that has a plurality of cutting blades or teeth arranged part-way around its periphery with a gap between the last and first blades, rotating the cutter in engagement with a gear blank while producing a relative rolling movement between the cutter and blank in time with the cutter rotation so that different blades of the cutter cut at different points of the roll, and indexing the blank when the gap in the cutter is abreast of the blank, said cutter having side cutting edges whose inclination to the axis of the cutter varies around the cutter, the inclination of any of said cutting edges to the axis of the cutter being determined by the phase of the rolling motion at which the blades cuts.

5. The method of cutting a pair of longitudinally curved tooth tapered gears with teeth tapering in depth from end to end which comprises cutting the tooth surfaces of one member of the pair by using a face-mill gear cutter which has opposite side-cutting edges that are of concave profile shape, and rotating said cutter in engagement with the blank while holding the blank stationary and periodically indexing the blank, and cutting the tooth surfaces of the other member of the pair conjugate to those of the first by using a face-mill gear cutter which has opposite side side-cutting edges that are of convex profile shape, and rotating said cutter in engagement with the gear blank while producing a relative rolling movement between the cutter and blank as though the blank were rolling on a tapered gear represented by the second cutter.

6. A face-mill gear cutter having a plurality of finishing blades whose side cutting edges have a uniform inclination to the axis of the cutter, and a plurality of roughing blades whose side cutting edges have varying inclination to the axis of the cutter.

7. The method of cutting a pair of longitudinally curved tooth tapered gears which comprises cutting one member of the pair with a cutter which has a plurality of cutting blades projecting beyond one side face in the general direction of the axis of the cutter and arranged part-way only around the periphery of the cutter with a gap between the last and first blades, said blades having opposite side cutting edges which are differently inclined to the axis of the cutter, the outside cutting edges having the greater inclination to the axis of the cutter by positioning said cutter in engagement with a gear blank with its axis inclined at other than right angles to a plane tangent to the root surface of the blank at the tooth space being cut, and rotating said cutter in engagement with the blank while holding the blank stationary on its axis and indexing the blank when the gap in the cutter is abreast of the blank, and cutting the other member of the pair conjugate to the first and two tooth sides simultaneously by positioning a cutter, whose cutting blades project beyond one side face of the cutter in the general direction of the axis of the cutter and are arranged part-way only around the periphery of the cutter with a gap between the last and first blades and whose cutting blades have opposite side cutting edges which are equally inclined to the axis of the cutter, in engagement with a second gear blank so that the axis of the second cutter is inclined at right angles to a plane tangent to the root surface of the second blank at the tooth space being cut, and rotating the second cutter on its axis while producing a relative rolling movement between the second cutter and blank and indexing the second blank when the gap in the second cutter is abreast of the blank.

8. The method of cutting a gear which comprises employing a rotary cutter that has a plurality of rough-cutting edges and a plurality of finish-cutting edges arranged part-way around its periphery with a gap between the last and the first edges, and in which the rough-cutting edges protrude laterally beyond the finish-cutting edges varying amounts at different points around the periphery of the cutter, and rotating said cutter in engagement with a gear blank while producing a relative rolling movement between the cutter and blank in time with the cutter rotation so that different blades of the cutter cut at different points in the roll, and indexing the blank when the gap in the cutter is abreast of the blank.

9. The method of cutting a gear which comprises employing a rotary cutter which has a plurality of rough-cutting and finish-cutting edges that project beyond one side face of the cutter in the general direction of the axis of the cutter and that are arranged part-way only around the periphery of the cutter with a gap between the last and first edges and in which corresponding finish-cutting edges have the same inclination to the axis of the cutter but have a greater inclination to the axis of the cutter than the pressure angle of the tooth surfaces which are to be cut and the rough-cutting edges have varying inclinations to the axis of the cutter and varying positions, and rotating said cutter in engagement with a gear blank while producing a relative rolling movement between the cutter and blank in time with the cutter rotation as though the gear being cut were rolling with a surface outside of its pitch surface on the surface of a basic gear represented by the cutter, and indexing the blank when the gap in the cutter is abreast of the blank.

10. A cutter for cutting gears in a generating operation having a rough-cutting portion and a finish-cutting portion, the rough-cutting portion protruding beyond the finish-cutting portion but having different positions and inclinations with reference to the finish cutting portion at different points along the effective length of the cutter so as not to interfere with the operation of the finish-cutting portion at different points in the generating roll.

11. A rotary cutter for cutting gears in a generating operation by continuous rotation of the cutter and intermittent indexing of the gear blank, said cutter having rough-cutting portions of varying inclination to the axis of the cutter and finish-cutting portions of uniform inclination to the axis of the cutter, said cutting portions extending only part-way around the periphery of the cutter and there being a gap between the end and beginning of said cutting portions.

12. A rotary gear cutter having a plurality of rough-cutting and a plurality of finish-cutting side edges arranged part-way around its periphery with a gap between the last and first edges, said finish-cutting edges having a uniform inclination to the axis of the cutter and said rough-cutting edges having varying positions and varying inclinations with reference to the axis of the cutter.

13. A rotary gear cutter having a plurality of cutting blades projecting beyond one side face in the general direction of the axis of the cutter and arranged part-way only around the periphery of the cutter with a gap between the last and first blades of sufficient angular extent to permit of indexing a gear blank, when the gap is abreast of the blank, without relative separation of cutter and blank, said blades having rough and finish-cutting edges for cutting opposite side tooth surfaces of a gear blank, corresponding finish-cutting edges having uniform inclination to the axis of the cutter and corresponding rough-cutting edges having uniformly varying positions with reference to the axis of the cutter.

14. A gear cutter having a plurality of straight side cutting edges and a plurality of curved side cutting edges, corresponding straight side cutting edges having uniform inclination to the axis of the cutter and corresponding curved side cutting edges having varying positions relative to the axis of the cutter.

15. A face-mill gear cutter having inside and outside cutting edges, corresponding successive side-cutting edges varying in profile shape on one side from the first blade to a central blade and on the other side from said central blade to the last blade, the variation being in reverse directions for the opposite side cutting edges, the last inside cutting edge being of the same shape as the first outside cutting edge and vice versa.

16. A gear cutter having a plurality of cutting blades which have inside and outside cutting edges, corresponding side cutting edges of alternate blades having uniform positions relative to the axis of the cutter and corresponding side cutting edges of the intermediate blades having varying positions relative to the axis of the cutter.

17. A gear cutter having a plurality of cutting blades which have opposite side cutting edges, corresponding side cutting edges of alternate blades having uniform positions relative to the axis of the cutter, and corresponding side cutting edges of the intermediate blades having varying positions relative to the axis of the cutter, the first group of side cutting edges being of straight profile and inclined to the axis of the cutter at an angle greater than the pressure angle of the gear to be cut.

18. A gear cutter having a plurality of cutting blades which have opposite side cutting edges, corresponding side cutting edges of alternate blades having uniform positions relative to the axis of the cutter, and corresponding side cutting edges of the intermediate blades having varying positions relative to the axis of the cutter, the first group of side cutting edges being of convex profile and being inclined to the axis of the cutter at an angle greater than the pressure angle of the gear to be cut.

19. A gear cutter having a plurality of cutting blades which have opposite side cutting edges, alternate blades having their corresponding side cutting edges inclined at a uniform angle to the axis of the cutter, corresponding side cutting edges of the intermediate blades having varying inclination to the axis of the cutter, the variation in inclination of the opposite side cutting edges of the latter blades being in the reverse order for opposite side cutting edges, the final pair of side cutting edges of said blades being symmetrical with reference to the first pair of side cutting edges of said blades.

20. A gear cutter having a plurality of cutting blades which have opposite side cutting edges, alternate blades having their corresponding side cutting edges inclined at a uniform angle to the axis of the cutter, the intermediate blades projecting beyond the first group of blades in the direction of tooth depth and having their side cutting edges at varying inclinations to the axis of the cutter, the variation in inclination being in the reverse order for the opposite side cutting edges of the latter group of blades, the final pair of side cutting edges of the latter group of blades being symmetrical to the first pair of side cutting edges of the latter group of blades.

21. A face-mill gear cutter having a plurality of fixed roughing blades and a plurality of fixed finishing blades projecting beyond one side face of the cutter in the general direction of the axis of the cutter, the roughing blades alternating with the finishing blades and having side cutting edges which protrude laterally beyond the corresponding side cutting edges of the finishing blades varying amounts at varying positions around the cutter.

22. A rotary gear cutter having rough and finish cutting edges for cutting opposite side tooth surfaces of a gear blank, corresponding finish cutting edges having the same inclination to the axis of the cutter and the same profile shape, corresponding rough cutting edges having varying inclinations to the axis of the cutter and varying profile shapes.

23. A rotary gear cutter having a plurality of cutting blades formed with side of basically straight profile that have portions which protrude laterally beyond said basically straight profile, the protruding portions of different blades being of varying profile shape and occupying varying parts of the heights of said blades.

24. A face-mill gear cutter having a plurality of cutting blades projecting beyond one side face of the cutter in the general direction of the axis of the cutter and arranged in several groups, the blades of the first group having opposite side cutting edges of equal pressure angle and being of gradually increasing height, the blades of the second group having outside cutting edges which are of gradually increasing pressure angle and inside cutting edges which are of gradually decreasing pressure angle, the blades of the third group having opposite side cutting edges which are offset laterally with respect to corresponding side cutting edges of the preceding groups, the side cutting edges of the third group of blades being of varying profile shape coordinated to cut at progressively different points during the generation of a gear blank.

25. A face-mill gear cutter having a plurality of cutting blades arranged part-way only around its periphery, said blades having opposite side cutting edges which are of convex profile shape, the radii of the opposite side cutting edges being unequal, said opposite side cutting edges being inclined to the axis of the cutter at angles greater than the pressure angle of the gear to be cut.

26. The method of generating a gear which comprises employing a cutter that has rough and finish cutting blades with opposite side cutting edges, corresponding finish-cutting edges being of constant inclination to the axis of the cutter and corresponding rough cutting edges having varying positions relative to the axis of the cutter and rotating said cutter in engagement with a gear blank while producing a relative rolling generating movement between the cutter and blank in such timed relation to the cutter rotation that the cutter makes one revolution per generating cycle and different blades of the cutter cut at different points in the generating roll, and indexing the blank periodically.

27. The method of generating a gear which comprises employing a cutter that has a plurality of cutting blades of varying profile curvature, and rotating said cutter in engagement with a gear blank while producing a relative rolling generating movement between the cutter and blank in such timed relation with the cutter rotation that the cutter makes one revolution per generating cycle and different blades of the cutter cut at different points in the generating roll, and indexing the blank periodically.

28. The method of generating a gear which comprises employing a cutter having roughing side cutting portions and finishing side cutting portions, the roughing portions protruding beyond the finishing portions at points where the finishing portions have no effective cutting action and the finishing portions having uniform inclination to the axis of the cutter, ond rotating said cutter in engagement with the gear blank while producing a relative rolling generating movement between the cutter and blank that is so timed to the cutter rotation that the cutter makes one revolution per generating cycle and different blades of the cutter cut at different points in the generating roll, and indexing the blank periodically.

29. The method of generating a gear which comprises employing a cutter that has rough side cutting portions and finish side cutting portions, the roughing portions protruding beyond the finishing portions at points where the finishing portions have no effective cutting action, the finishing portions being of uniform inclination to the axis of the cutter and being inclined to the axis of the cutter at an angle greater than the pressure angle of the gear to be cut, and rotating the cutter in engagement with a gear blank while producing a relative rolling movement between the cutter and blank as though the blank were rolling with a surface outside of its pitch surface on the surface of a basic gear represented by the cutter, the rolling movement being so timed to the cutter rotation that the cutter makes one revolution per generating cycle.

30. The method of generating a gear which comprises employing a cutter having a plurality of roughing blades of gradually increasing height whose opposite side cutting edges have equal inclination to the axis of the cutter and are followed by a plurality of cutting blades whose outside cutting edges have gradually increasing pressure angle and whose inside cutting edges have gradually decreasing pressure angle and are followed by a plurality of cutting blades whose opposite side cutting edges have varying inclination to the axis of the cutter but are offset laterally with reference to the corresponding side cutting edges of the preceding blades, rotating said cutter in engagement with the gear blank and feeding the cutter into the blank with the blank held stationary while the first group of blades are cutting, then rolling the cutter and blank relative to one another in one direction while the second group of blades are cutting and in the opposite direction while the third group of blades are cutting, said rolling motion being timed to the cutter rotation.

31. The method of cutting a pair of longitudinally curved tooth tapered gears which comprises cutting one member of the pair with a face-mill gear cutter, whose opposite side cutting edges are of concave profile curvature but have different radii of curvature, the outside cutting edges having the greater radius of curvature, by rotating said cutter in engagement with a gear blank while holding the blank stationary, and indexing the blank periodically, and cutting the other member of the pair conjugate to the first with a face-mill gear cutter whose opposite side cutting edges are of convex profile curvature but of different radii of curvature, the radius of curvature of the inside cutting edges of the second cutter being greater than the radius of the outside cutting edges of the second cutter and, by rotating the second cutter in engagement with a gear blank while effecting a relative rolling movement between the cutter and blank about an axis which is inclined to the axis of the blank at an angle different from the angle between the axes of the pair of gears when in mesh so as to obtain less than full profile contact between the mating tooth surfaces of the pair of gears when they run in mesh.

32. A face-mill gear cutter having a plurality of cutting blades projecting beyond one side face and arranged part way only around its periphery with a gap between the last and first blades of sufficient angular extent to permit of indexing a gear blank, when the gap is abreast of the blank, without relative separation of the cutter and blank, each of said blades having a finish-cutting side edge and a rough-cutting side edge, the roughing edge protruding laterally beyond the finishing edge, the finishing edges being of uniform shape and inclination to the axis of the cutter, and the amount which the roughing edges protrude laterally beyond corresponding finishing edges varying on different blades.

33. A face-mill gear cutter having a plurality of cutting blades arranged part way around its periphery with a gap between the last and first blades of sufficient angular extent to permit of indexing a gear blank, when the gap is abreast of the blank, without relative separation of the cutter and blank, each of said blades having a finish-cutting side edge and a rough-cutting side edge, the roughing edges protruding laterally beyond the finishing edges, the finishing edges being of straight profile shape and constant inclination to the axis of the cutter, the roughing edges being of curved profile shape and the amount that the roughing edges protrude beyond corresponding finishing edges varying on different blades.

34. The method of cutting a pair of gears which comprises cutting one member of the pair with a face-mill gear cutter whose opposite side-cutting edges are of concave profile curvature but have different radii of curvature, by rotating said cutter in engagement with a gear blank while holding the blank stationary, and indexing the blank periodically, and cutting the other member of the pair conjugate to the first with a face-mill gear cutter whose opposite side-cutting edges are of convex profile curvature and greater pressure angle than the pressure angle of the tooth surfaces to be cut, but whose inside cutting edges have a radius of curvature equal to the outside cutting edges of the first cutter and vice versa, by rotating the second cutter in engagement with a second gear blank while producing a relative rolling movement between the second cutter and blank as though the second blank were rolling with a surface outside of its pitch surface on the pitch surface of a tapered gear represented by the second cutter.

35. The method of cutting a longitudinally curved tooth tapered gear whose teeth have the same pressure angles on opposite sides which comprises employing a face-mill gear cutter, whose outside cutting edges are more inclined to the cutter axis than its inside cutting edges, and positioning said cutter so that the axis of the cutter is inclined at other than right angles to a plane tangent to the root surface of the gear at the tooth space being cut, and rotating the cutter in engagement with the blank while holding the blank stationary on its axis, and periodically indexing the blank.

ERNEST WILDHABER.